US012753097B2

(12) United States Patent
Takahashi et al.

(10) Patent No.: US 12,753,097 B2
(45) Date of Patent: Oct. 6, 2026

(54) WATER TREATMENT APPARATUS AND WATER TREATMENT METHOD

(71) Applicant: ORGANO CORPORATION, Tokyo (JP)

(72) Inventors: Yusuke Takahashi, Tokyo (JP); Naonori Momotani, Tokyo (JP); Keisuke Sasaki, Tokyo (JP); Kazushige Takahashi, Tokyo (JP); Fumio Sudo, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 463 days.

(21) Appl. No.: 18/011,297

(22) PCT Filed: May 24, 2021

(86) PCT No.: PCT/JP2021/019570
§ 371 (c)(1),
(2) Date: Dec. 19, 2022

(87) PCT Pub. No.: WO2021/261145
PCT Pub. Date: Dec. 30, 2021

(65) Prior Publication Data

US 2023/0192515 A1 Jun. 22, 2023

(30) Foreign Application Priority Data

Jun. 23, 2020 (JP) ................................ 2020-107734
Jun. 23, 2020 (JP) ................................ 2020-107735

(51) Int. Cl.
*C02F 1/76* (2023.01)
*C02F 1/32* (2023.01)
(Continued)

(52) U.S. Cl.
CPC ................ *C02F 1/766* (2013.01); *C02F 1/32* (2013.01); *C02F 1/722* (2013.01);
(Continued)

(58) Field of Classification Search
CPC .. C02F 1/766; C02F 1/32; C02F 1/722; C02F 2001/422; C02F 2101/30; C02F 2209/20;
(Continued)

(56) References Cited

U.S. PATENT DOCUMENTS

| | | | | |
|---|---|---|---|---|
| 4,402,836 A * | 9/1983 | Fochtman | ................ | C02F 1/76 210/903 |
| 8,480,906 B2 * | 7/2013 | Kobayashi | ................ | C02F 9/00 210/764 |

(Continued)

FOREIGN PATENT DOCUMENTS

| | | |
|---|---|---|
| JP | 5-305297 A | 11/1993 |
| JP | 9-38670 A | 2/1997 |

(Continued)

OTHER PUBLICATIONS

International Search Report issued in International Patent Application No. PCT/JP2021/019570, dated Jul. 20, 2021, along with an English translation thereof.

(Continued)

*Primary Examiner* — Bobby Ramdhanie
*Assistant Examiner* — William Addison Geisbert
(74) *Attorney, Agent, or Firm* — Greenblum & Bernstein, P.L.C.

(57) ABSTRACT

A water treatment apparatus that can remove persistent organic materials more efficiently is provided. Water treatment apparatus has hypohalogenous acid addition unit that adds hypohalogenous acid to water to be treated that contains organic materials; and ultraviolet ray radiating apparatus that is positioned downstream of hypohalogenous acid
(Continued)

addition unit and that radiates ultraviolet rays to the water to be treated to which the hypohalogenous acid has been added.

10 Claims, 9 Drawing Sheets

(51) Int. Cl.
*C02F 1/42* (2023.01)
*C02F 1/72* (2023.01)
*C02F 101/30* (2006.01)

(52) U.S. Cl.
CPC .... *C02F 2001/422* (2013.01); *C02F 2101/30* (2013.01); *C02F 2209/20* (2013.01)

(58) Field of Classification Search
CPC .. C02F 1/001; C02F 1/20; C02F 1/283; C02F 1/42; C02F 1/441; C02F 2101/38; C02F 2209/06; C02F 2209/08; C02F 9/00; C02F 2303/18
USPC .......................................................... 210/749
See application file for complete search history.

(56) References Cited

U.S. PATENT DOCUMENTS

| | | | | |
|---|---|---|---|---|
| 2010/0187175 | A1 | 7/2010 | Kolios et al. | |
| 2012/0298591 | A1 * | 11/2012 | Sichel | C02F 1/76 210/199 |
| 2016/0221841 | A1 | 8/2016 | Fukui et al. | |
| 2017/0253499 | A1 | 9/2017 | Fukui et al. | |

FOREIGN PATENT DOCUMENTS

| | | | | | |
|---|---|---|---|---|---|
| JP | 9-94585 | A | | 4/1997 | |
| JP | H0994585 | A | * | 4/1997 | |
| JP | 10-235379 | | | 9/1998 | |
| JP | 10-277572 | A | | 10/1998 | |
| JP | 11-226569 | | | 8/1999 | |
| JP | 2007-160241 | A | | 6/2007 | |
| JP | 2008-055366 | | | 3/2008 | |
| JP | 2010-531724 | A | | 9/2010 | |
| JP | 2011-218249 | | | 11/2011 | |
| JP | 2012-061443 | | | 3/2012 | |
| JP | 5512357 | B2 | | 6/2014 | |
| JP | 2015-093226 | | | 5/2015 | |
| JP | 2015100733 | A | * | 6/2015 | |
| JP | 2015-157262 | A | | 9/2015 | |
| JP | 2016-107249 | | | 6/2016 | |
| JP | 2019-63768 | A | | 4/2019 | |
| WO | WO-2015068635 | A1 | * | 5/2015 | C02F 1/42 |

OTHER PUBLICATIONS

International Preliminary Report on Patentability issued in International Patent Application No. PCT/JP2021/019570, dated Dec. 13, 2022, along with an English translation thereof.

* cited by examiner

WATER TREATMENT APPARATUS AND WATER TREATMENT METHOD

FIELD OF THE INVENTION

The present application is based on, and claims priority from, JP2020-107734 and JP2020-107735, filed on Jun. 23, 2020, the disclosure of which is hereby incorporated by reference herein in their entirety.

The present invention relates to a water treatment apparatus and a water treatment method.

BACKGROUND OF THE INVENTION

As strict demand for the water quality of water to be treated, such as pure water, has been rising, various methods have been recently studied to decompose and remove small amounts of organic materials that are contained in water to be treated. As one typical method, a process of decomposing and removing organic materials by an oxidation process using ultraviolet rays has been introduced.

JP5512357B, JPH5-305297, and JPH10-277572 disclose methods of adding hydrogen peroxide and radiating ultraviolet rays to the water to be treated in order to remove organic materials.

Hydrogen peroxide cannot sufficiently remove persistent organic materials such as urea. The present invention aims at providing a water treatment apparatus that can remove persistent organic materials more efficiently.

A water treatment apparatus of the present invention comprises: hypohalogenous acid addition means that adds hypohalogenous acid to water to be treated that contains organic materials; and an ultraviolet ray radiating apparatus that is positioned downstream of the hypohalogenous acid addition means and that radiates ultraviolet rays to the water to be treated to which the hypohalogenous acid has been added.

According to the present invention, it is possible to provide a water treatment apparatus that can remove persistent organic materials more efficiently.

The above and other objects, features, and advantages of the present invention will become apparent from the following description with reference to the accompanying drawings which illustrate examples of the present invention.

DESCRIPTION OF EMBODIMENTS

Embodiments 1A to 1C

Figure 1A:
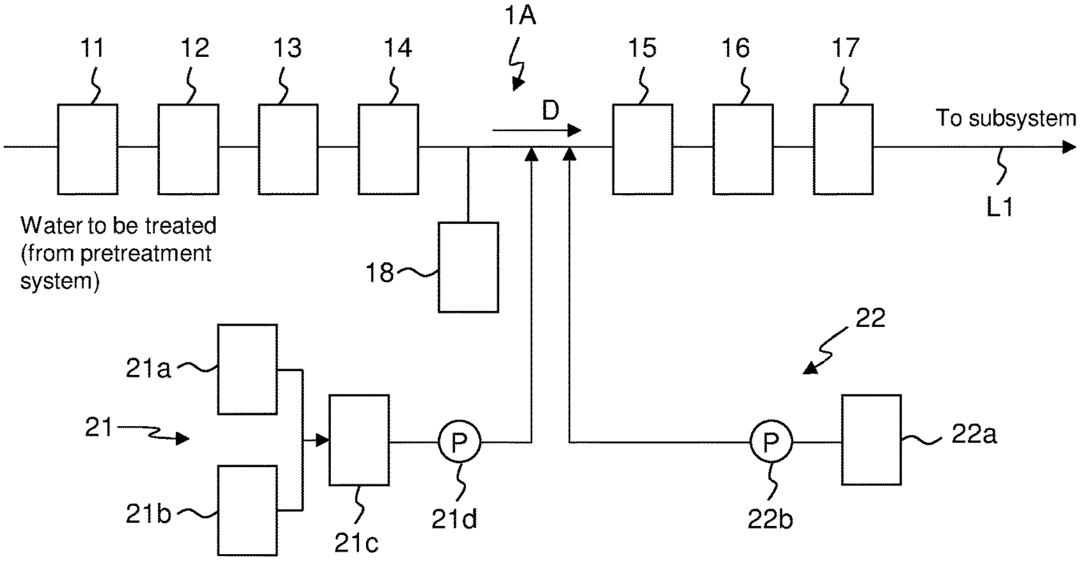
FIG. 1A is a schematic view illustrating the arrangement of a water treatment apparatus according to Embodiment 1A.

Some embodiments of the apparatus and the method for water treatment of the present invention will now be described with reference to the drawings. FIG. 1A schematically illustrates the arrangement of water treatment apparatus 1A according to Embodiment 1A of the present invention. In the following embodiments, a pure water production apparatus and a pure water production method will be described as an example of the apparatus and the method for water treatment. Specifically, pure water is an example of water to be treated and the type of the water to be treated is not limited as long as the water to be treated contains organic materials. Water treatment apparatus 1 (primary system), that is a pure water production apparatus, constitutes an apparatus for producing ultrapure water together with an upstream pretreatment system and a downstream subsystem (secondary system). Raw water (hereinafter, referred to as water to be treated) that is produced by the pretreatment system contains organic materials that include urea.

Water treatment apparatus 1A includes filter device 11, activated carbon tower 12, first ion exchanger apparatus 13, reverse osmosis membrane apparatus 14, ultraviolet ray radiating apparatus (ultraviolet ray oxidation apparatus) 15, second ion exchanger apparatus 16, and deaerator apparatus 17, and these apparatuses are arranged in a series along main line L1 from upstream to downstream in flow direction D of the water to be treated. The water to be treated is pressurized by a raw water pump (not illustrated), and thereafter large dust and the like having relatively large particle diameters are removed by filter device 11, and impurities such as high-molecular organic materials are removed by activated carbon tower 12. First ion exchanger apparatus 13 includes a cation tower (not illustrated) in which cation exchanger resins are loaded, a decarboxylation tower (not illustrated), and an anion tower (not illustrated) in which anion exchanger resins are loaded, and these towers are arranged in a series from upstream to downstream in the order mentioned above. Cation components in the water to be treated are removed by the cation tower, carbonic acid in the water to be treated is removed by the decarboxylation tower, anion components in the water to be treated are removed by the anion tower, and ion components are further removed by reverse osmosis membrane apparatus 14.

Water treatment apparatus 1A includes hypohalogenous acid addition means 21 that adds hypohalogenous acid to the water to be treated. In the present embodiment, hypohalogenous acid is hypobromous acid but may alternatively be hypochlorous acid or hypoiodous acid. Hypohalogenous acid addition means 21 includes storage tank 21*a* of sodium bromide (NaBr) (means for supplying sodium bromide), storage tank 21*b* of sodium hypochlorite (NaClO) (means for supplying sodium hypochlorite), agitation tank 21*c* of sodium bromide and sodium hypochlorite (means for mixing sodium bromide and sodium hypochlorite), and transfer pump 21*d*. Since hypobromous acid is difficult to keep for a long time, hypobromous acid is produced by mixing sodium bromide and sodium hypochlorite at the time when it is used. The hypobromous acid that is produced in agitation tank 21*c* (mixing means) is pressurized by transfer pump 21*d* and is added to the water to be treated that flows in main line L1 at a point between reverse osmosis membrane apparatus 14 and ultraviolet ray radiating apparatus 15. Alternatively, sodium bromide and sodium hypochlorite may be directly supplied to main line L1 such that they are agitated by the flow of the water to be treated in main line L1 to thereby produce hypobromous acid.

Ultraviolet ray radiating apparatus 15 that is positioned downstream of hypohalogenous acid addition means 21 radiates ultraviolet rays to the water to be treated to which hypohalogenous acid has been add. Ultraviolet ray radiating apparatus 15 may use an ultraviolet ray lump having a wavelength of, for example, at least either 254 nm or 185 nm. The ultraviolet rays preferably include a wavelength component of 185 nm, which has high energy and effectively decomposes organic materials. The radiation of ultraviolet rays helps hypobromous acid decompose organic materials (urea). However, hypochlorous acid is more easily decomposed by ultraviolet rays than hypobromous acid, and therefore when a large amount of ultraviolet rays is radiated, the reaction of decomposing hypochlorous acid is promoted and excessive energy is consumed. In addition, the reaction of producing hypobromous acid may not progress due to the shortage of hypochlorous acid that produces hypobromous acid.

Conventionally, a method is known of adding hydrogen peroxide to water to be treated in order to remove organic materials. Hydrogen peroxide generates hydroxyl radicals when radiated by ultraviolet rays, and oxidative decomposition of organic materials is promoted by the hydroxyl radicals. However, as will be described in Example 1, hypohalogenous acid is much more effective than hydrogen peroxide for removing persistent organic materials such as urea. Therefore, according to the present embodiment, it is possible to reduce the concentration of persistent organic materials such as urea in ultrapure water that is supplied to points of use.

Second ion exchanger apparatus 16 that is positioned downstream of ultraviolet ray radiating apparatus 15 is a regenerative ion exchanger resin tower in which anion exchanger resins and cation exchanger resins are loaded. Decomposition products of organic materials that are generated in the water to be treated by radiating ultraviolet rays are removed by second ion exchanger apparatus 16. Thereafter, dissolved oxygen in the water to be treated is removed by deaerator apparatus 17.

As will be described in detail in Example 1, the removal rate of urea is largely improved when the pH of the water to be treated is 8 or less. For this reason, pure water production apparatus 1A includes pH adjusting means 22 upstream of ultraviolet ray radiating apparatus 15. pH adjusting means 22 includes, for example, storage tank 22*a* of a pH adjusting liquid such as sulfuric acid or hydrochloric acid and transfer pump 22*b*. The pH adjusting liquid is pressurized by transfer pump 22*b* and is added to the water to be treated that flows in main line L1 at a position between reverse osmosis membrane apparatus 14 and ultraviolet ray radiating apparatus 15. pH adjusting means 22 adjusts the pH of the water to be treated to 8 or less, preferably 7 or less, more preferably 5 or less, and still more preferably 4 or less. The lower limit of pH is not limited in view of the removal rate of urea but is preferably 3 or more considering the influence on the downstream apparatuses.

As will also be described in detail in Example 1, the TOC reduction rate is largely improved by adding hypohalogenous acid having mass concentration that is at least 30 times, preferably at least 60 times, more preferably at least 120 times, and still more preferably at least 250 times the TOC of the water to be treated upstream of hypohalogenous acid addition means 21. For this reason, pure water production apparatus 1A includes TOC analysis means 18 such as a TOC meter that measures the TOC of the water to be treated upstream of hypohalogenous acid addition means 21. The position of TOC analysis means 18 is not limited as long as it is positioned upstream of hypohalogenous acid addition means 21 but is preferably immediately upstream of the point at which hypohalogenous acid is added. For this reason, TOC analysis means 18 is provided between reverse osmosis membrane apparatus 14 and hypohalogenous acid addition means 21. The mass concentration of hypohalogenous acid that is added is not limited in view of the TOC reduction rate but is preferably no more than 2000 times the TOC considering the influence on the downstream apparatuses. Alternatively, urea analysis means such as a urea meter may be used as TOC analysis means 18. In this case, the removal rate of urea is largely improved by adding hypohalogenous acid having mass concentration that is at least 5 times, preferably at least 12 times, more preferably at least 25 times, and still more preferably at least 50 times the concentration of urea in the water to be treated upstream of hypohalogenous acid addition means 21. The mass concentration of hypohalogenous acid that is added is not limited in view of the removal rate of urea but is preferably no more than 400 times the mass concentration of urea considering the influence on the downstream apparatuses.

Figure 1B:
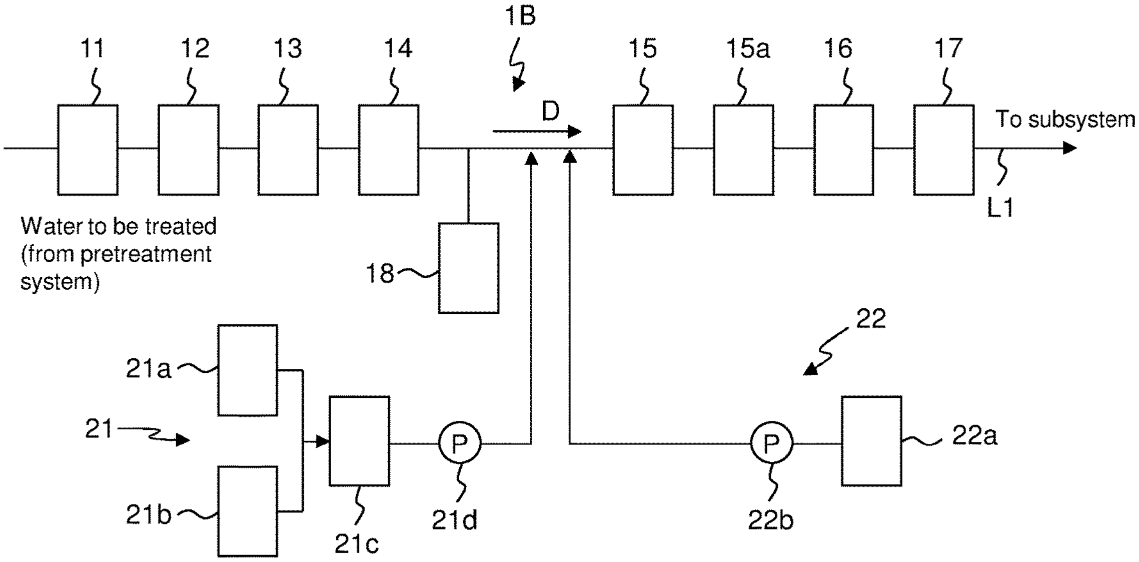
FIG. 1B is a schematic view illustrating the arrangement of a water treatment apparatus according to Embodiment 1B.

FIG. 1B schematically illustrates the arrangement of water treatment apparatus 1B according to Embodiment 1B of the present invention. In the present embodiment, another ultraviolet ray radiating apparatus 15*a* is arranged in a series with and downstream of ultraviolet ray radiating apparatus 15, that is, between ultraviolet ray radiating apparatus 15 and second ion exchanger apparatus 16. The arrangement is otherwise the same as that of Embodiment 1A. Ultraviolet ray radiating apparatus 15*a* on the downstream side removes hypohalogenous acid that remains in the water to be treated by photolysis. Accordingly, the load imposed on second ion exchanger apparatus 16 can be reduced and oxidative degradation of the resins in second ion exchanger apparatus 16 may be limited. An ultraviolet ray lamp having a wavelength of at least either 254 nm or 185 nm that is used in ultraviolet ray radiating apparatus 15 may also be used in another ultraviolet ray radiating apparatus 15*a*.

Figure 1C:
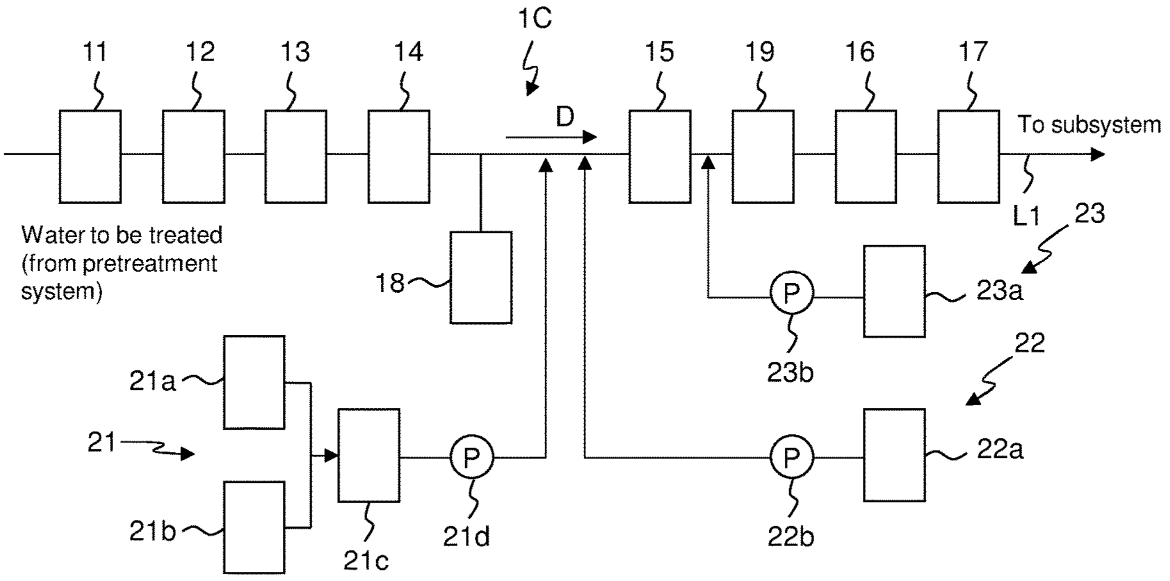
FIG. 1C is a schematic view illustrating the arrangement of a water treatment apparatus according to Embodiment 1C.

FIG. 1C schematically illustrates the arrangement of water treatment apparatus 10 according to Embodiment 10 of the present invention. In the present embodiment, reducing agent addition means 23 is arranged downstream of ultraviolet ray radiating apparatus 15. In addition, reverse osmosis membrane apparatus 19 is provided downstream of reducing agent addition means 23 and upstream of second ion exchanger apparatus 16. The arrangement is otherwise the same as that of Embodiment 1A. Reducing agent addition means 23 removes hypohalogenous acid that remains in the water to be treated. Hydrogen peroxide, sodium sulfite, and the like may be used as the reducing agent. Reducing agent addition means 23 includes storage tank 23*a* of the reducing agent and transfer pump 23*b*. The reducing agent is pressurized by transfer pump 23*b* and is added to the water to be treated that flows in main line L1 at a position between ultraviolet ray radiating apparatus 15 and reverse osmosis membrane apparatus 19. Reverse osmosis membrane apparatus 19 removes excess reducing agent. Alternatively, the means for removing the reducing agent may be ion exchanger resins, an electro-deionization apparatus, or the like. These means for removing the reducing agent may also be combined in a series.

The means for removing hypohalogenous acid is not limited to Embodiments 1B and 1C, and another ultraviolet ray radiating apparatus 15*a* and reducing agent addition means 23 are examples of means for removing hypohalogenous acid. Thus, any means for removing hypohalogenous acid (means for removing an oxidizing agent) having the same effect may be used. For example, a platinum group catalyst such as palladium (Pd), activated carbon, and the like may be used. These means for removing hypohalogenous acid may also be combined in a series.

Embodiments 2A and 2B

Figure 2A:
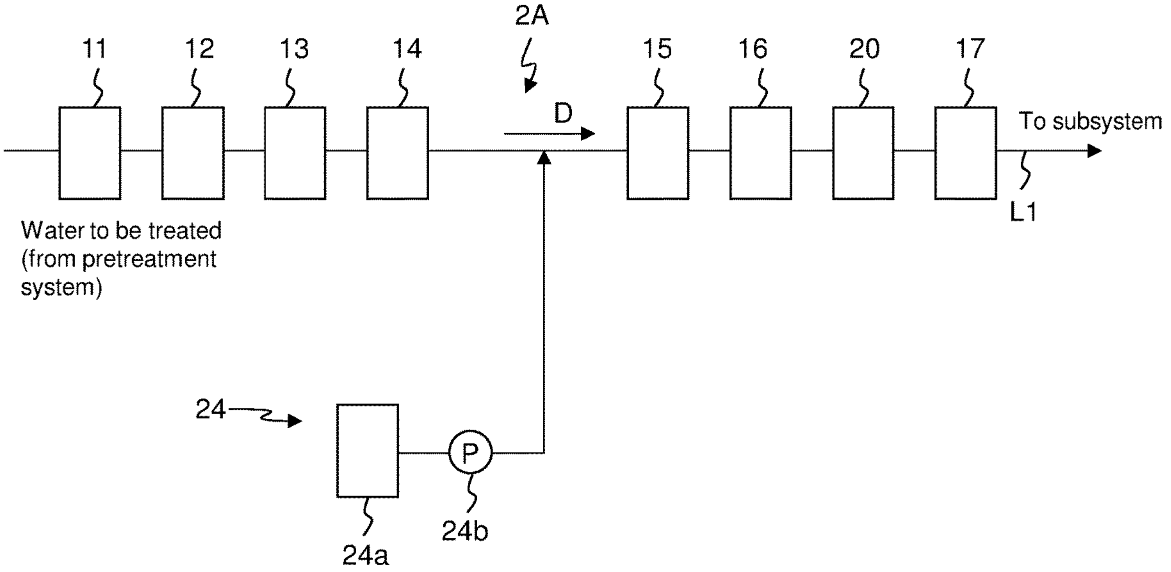
FIG. 2A is a schematic view illustrating the arrangement of a water treatment apparatus according to Embodiment 2A.

FIG. 2A schematically illustrates the arrangement of water treatment apparatus 2A according to Embodiment 2A of the present invention. In the present embodiment, hydrogen peroxide is used to oxidize and decompose compounds such as organic materials. The water to be treated contains anions as well as any compound that is oxidized and decomposed by hydrogen peroxide. Pure water production apparatus 2A includes filter device 11, activated carbon tower 12, first ion exchanger apparatus 13, reverse osmosis membrane apparatus 14, ultraviolet ray radiating apparatus 15, second ion exchanger apparatus 16, and deaerator apparatus 17, and these apparatuses are arranged in a series along main line L1 from upstream to downstream in flow direction D of the water to be treated. These apparatuses 11 to 17 have the same arrangements as Embodiments 1A to 1C. In the present embodiment, hydrogen peroxide addition means 24 is provided between reverse osmosis membrane apparatus 14 and ultraviolet ray radiating apparatus 15. Hydrogen peroxide addition means 24 includes storage tank 24*a* of hydrogen peroxide and transfer pump 24*b*. Hydrogen peroxide is pressurized by transfer pump 24*b* and is added to the water to be treated that flows in main line L1 at a position between reverse osmosis membrane apparatus 14 and ultraviolet ray radiating apparatus 15. Ultraviolet rays are radiated by ultraviolet ray radiating apparatus 15 to the water to be treated to which hydrogen peroxide has been added. Thus, hydroxyl radicals are generated from the hydrogen peroxide, and the hydroxyl radicals promote the oxidative decomposition of the organic materials. As described above, hydrogen peroxide is not as effective for removing persistent organic materials such as urea but is effective for the oxidative decomposition of non-persistent general compounds. Catalyst tower 20 in which catalyst carriers that carry platinum group catalysts are loaded is provided downstream of second ion exchanger apparatus 16 (an apparatus for removing anions), that is, between second ion exchanger apparatus 16 and deaerator apparatus 17.

Second ion exchanger apparatus 16 is an ion exchanger tower in which at least anion exchangers such as anion exchanger resins are loaded and removes at least anions from the water to be treated to which hydrogen peroxide has been added. The ion exchanger tower is preferably regenerative. In the present embodiment, anion exchanger resins are loaded in second ion exchanger apparatus 16, but cation exchanger resins may be further loaded in second ion exchanger apparatus 16. In this case, the anion exchanger resins and the cation exchanger resins may be loaded in a dual bed or in a mixed bed. A regenerative and dual-bed type ion exchanger tower is particularly preferable due to the ease of the regeneration operation. When the resins are loaded in a dual bed, either the anion exchanger resins or the cation exchanger resins may be loaded on the upstream side in flow direction D of the water to be treated. Alternatively, an anion tower in which anion exchanger resins are loaded and a cation tower in which cation exchanger resins are loaded may be provided separately. The arrangement of second ion exchanger apparatus 16 is not limited as long as it functions as an anion removing means that removes anions from water to be treated that contains hydrogen peroxide and anions.

The platinum group catalyst carriers that are loaded in catalyst tower 20 are anion exchangers, and in the present embodiment, are anion exchanger resins that carry platinum group catalysts that consist of a platinum group metal. The platinum group catalyst carriers remove hydrogen peroxide that is contained in the water to be treated from which the anions are removed. As the anion exchangers, monolithic organic porous anion exchangers may also be used. The platinum group catalysts decompose hydrogen peroxide using its catalyzing function. Platinum group metals include platinum (Pt), palladium (Pd), ruthenium (Ru), rhodium (Rh), osmium (Os), iridium (Ir), and the like. Only one of these metals may be used, or a combination of two or more of these metals may be used. Among these platinum group metals, Pt and Pd are preferable, and Pd is more preferable in view of cost.

Excessive hydrogen peroxide that has been added to the water to be treated and that was not used to decompose the compounds comes into contact with platinum group catalysts so as to be decomposed into water and oxygen and removed. As will be described later in Example 2, the efficiency of platinum group catalysts in removing hydrogen peroxide increases as the anion component that is contained in the water to be treated decreases. Thus, in the present embodiment, second ion exchanger apparatus 6 is arranged upstream of the platinum group catalysts.

Conventionally, hydrogen peroxide is believed to oxidize and degrade ion exchangers. For this reason, platinum group catalysts are arranged upstream of ion exchangers in order to limit the amount of hydrogen peroxide that comes into contact with the ion exchangers. However, according to experiments that were conducted at this time, it was found that hydrogen peroxide had little effect on the anion exchangers. This effect is believed to occur because the concentration of hydrogen peroxide is too low to cause damage to the anion exchangers in applications for producing pure water. In addition, hydrogen peroxide does not affect the water quality of ultrapure water that is supplied to points of use because hydrogen peroxide is finally decomposed by the platinum group catalysts.

Figure 2B:
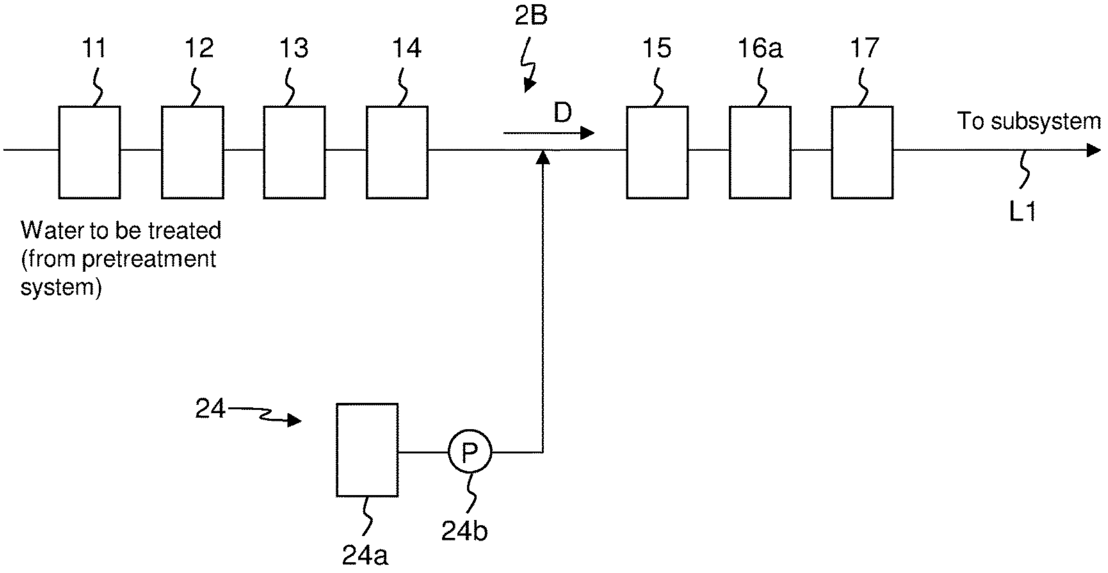
FIG. 2B is a schematic view illustrating the arrangement of a water treatment apparatus according to Embodiment 2B.

FIG. 2B schematically illustrates the arrangement of water treatment apparatus 2B according to Embodiment 2B of the present invention. In the present embodiment, anion exchangers and platinum group catalyst carriers are loaded in second ion exchanger apparatus 16*a*. The arrangement is otherwise the same as that of Embodiment 2A. Specifically, second ion exchanger apparatus 16 and catalyst tower 20 are separately provided in Embodiment 2A, while anion exchangers and platinum group catalyst carriers are loaded in a single ion exchanger tower (second ion exchanger apparatus 16*a*) in the present embodiment. Accordingly, pure water production apparatus 2B can be made compact. Cation exchangers may be further loaded in second ion exchanger apparatus 16*a* in the same manner as in Embodiment 2A. In other words, second ion exchanger apparatus 16*a* may be a regenerative ion exchanger tower in which anion exchangers, cation exchangers, and platinum group catalyst carriers are loaded separately. In this case, the loading position of the cation exchangers is not limited as long as the platinum group catalyst carriers are positioned downstream of the anion exchangers. Specifically, the anion exchangers, the cation exchangers, and the platinum group catalyst carriers may be loaded in second ion exchanger apparatus 16*a* in the order shown below from upstream to downstream in flow direction D of the water to be treated.

(1) anion exchangers/platinum group catalyst carriers/cation exchangers (2) cation exchangers/anion exchangers/platinum group catalyst carriers (3) anion exchangers/cation exchangers/platinum group catalyst carriers Since the platinum group catalyst carriers are anion exchangers, as described above, the platinum group catalyst carriers and the anion exchangers are preferably arranged adjacent to each other (as in (1) or (2)). This arrangement allows the platinum group catalyst carriers and the anion exchangers to be handled together in a regeneration operation and simplifies the regeneration processes. In addition, an existing ion exchanger tower can be easily utilized by replacing a part of the portion in which anion exchangers are conventionally loaded with platinum group catalyst carriers.

Hydrogen peroxide addition means 24 is provided upstream of ultraviolet ray radiating apparatus 15 in the embodiments shown in FIGS. 2A and 2B, but hydrogen peroxide addition means 24 may be omitted. Since hydrogen peroxide is generated in the water to be treated by radiating ultraviolet rays from ultraviolet ray radiating apparatus 15, second ion exchanger apparatuses 16 and 16*a* have a similar effect. In addition, although not illustrated, an electrodeionization apparatus having a demineralizer chamber in which platinum group catalyst carriers are loaded may be used as second ion exchanger apparatuses 16 and 16*a*.

Third Embodiments 3A and 3B

Figure 3A:
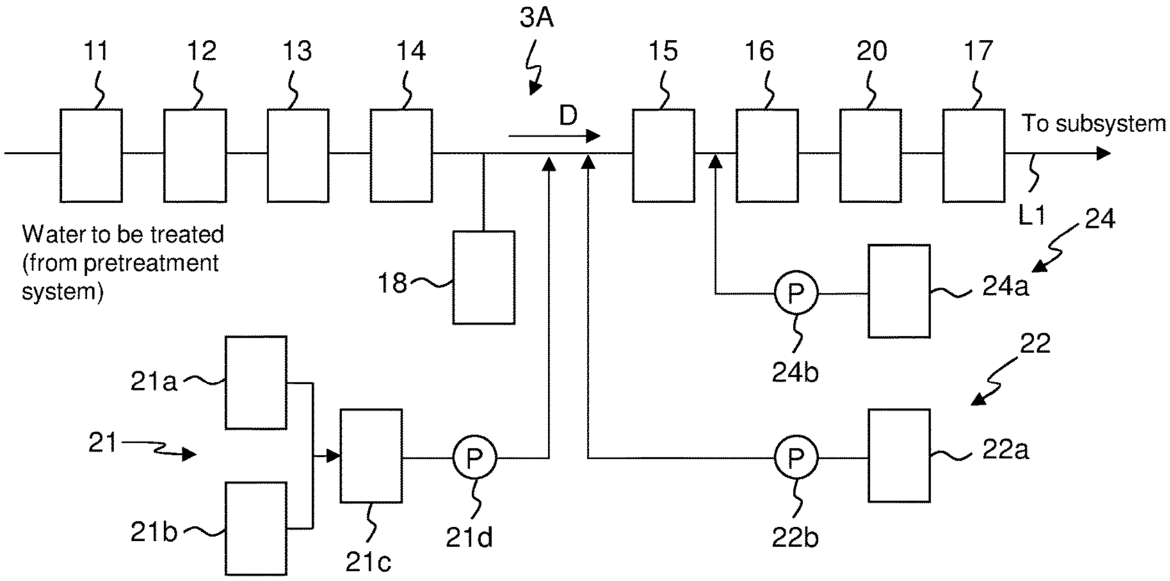
FIG. 3A is a schematic view illustrating the arrangement of a water treatment apparatus according to Embodiment 3A.

Embodiments 3A and 3B have arrangements in which Embodiments 1A to 1C and Embodiments 2A and 2B are combined. Accordingly, the arrangement and the effect of each apparatus are described in each embodiment. FIG. 3A schematically illustrates the arrangement of water treatment apparatus 3A according to Embodiment 3A of the present invention. Water treatment apparatus 3A includes filter device 11, activated carbon tower 12, first ion exchanger apparatus 13, reverse osmosis membrane apparatus 14, ultraviolet ray radiating apparatus 15, second ion exchanger apparatus 16, catalyst tower 20 (platinum group catalyst carriers), and deaerator apparatus 17, and these apparatuses are arranged in a series along main line L1 from upstream to downstream in flow direction D of the water to be treated. These apparatuses 11 to 17 and 20 have the same arrangement as those in Embodiment 2A. Pure water production apparatus 3A further includes hypohalogenous acid addition means 21 that adds hypohalogenous acid to the water to be treated. Hypohalogenous acid addition means 21 has the same arrangement as in Embodiments 1A to 1C and adds hypohalogenous acid to the water to be treated at a position between reverse osmosis membrane apparatus 14 and ultraviolet ray radiating apparatus 15. Water treatment apparatus 3A further includes pH adjusting means 22 upstream of ultraviolet ray radiating apparatus 15 as in Embodiments 1A to 1C. Pure water production apparatus 3A further includes TOC analysis means 18 such as a TOC meter that measures the TOC of the water to be treated upstream of hypohalogenous acid addition means 21 as in Embodiments 1A to 1C.

In the present embodiment, hypohalogenous acid is added to the water to be treated in order to remove persistent organic materials such as urea in the same manner as in Embodiments 1A to 1C, and the pH of the water to be treated is adjusted to 3 to 8 and preferably 3 to 5 by pH adjusting means 22. Ultraviolet rays that are radiated by ultraviolet ray radiating apparatus 15 help hypobromous acid to decompose organic materials (urea). Hypohalogenous acid may oxidize and degrade the ion exchangers in downstream second ion exchanger apparatus 16 due to its strong oxidizing effect. Thus, hydrogen peroxide is added to the water to be treated in order to remove the remaining hypohalogenous acid. For this purpose, water treatment apparatus 3A includes hydrogen peroxide addition means 24 that is positioned downstream of ultraviolet ray radiating apparatus 15, that is, between ultraviolet ray radiating apparatus 15 and second ion exchanger apparatus 16. In other words, hydrogen peroxide addition means 24 adds hydrogen peroxide to the water to be treated to which ultraviolet rays have been radiated. Hydrogen peroxide addition means 24 includes storage tank 24*a* of hydrogen peroxide and transfer pump 24*b*, as in Embodiments 2A to 2C. Hypohalogenous acid can also be removed, for example, by sulfite, but hydrogen peroxide is preferable because sulfite imposes a larger load on the downstream ion exchangers. After hypohalogenous acid is removed by hydrogen peroxide, excessive hydrogen peroxide is removed by the platinum group catalysts in the same manner as in Embodiments 2A and 2B. In this process, anion components are removed in advance by second ion exchanger apparatus 16, and thereby the efficiency of removing hydrogen peroxide by the platinum group catalysts is enhanced.

Figure 3B:
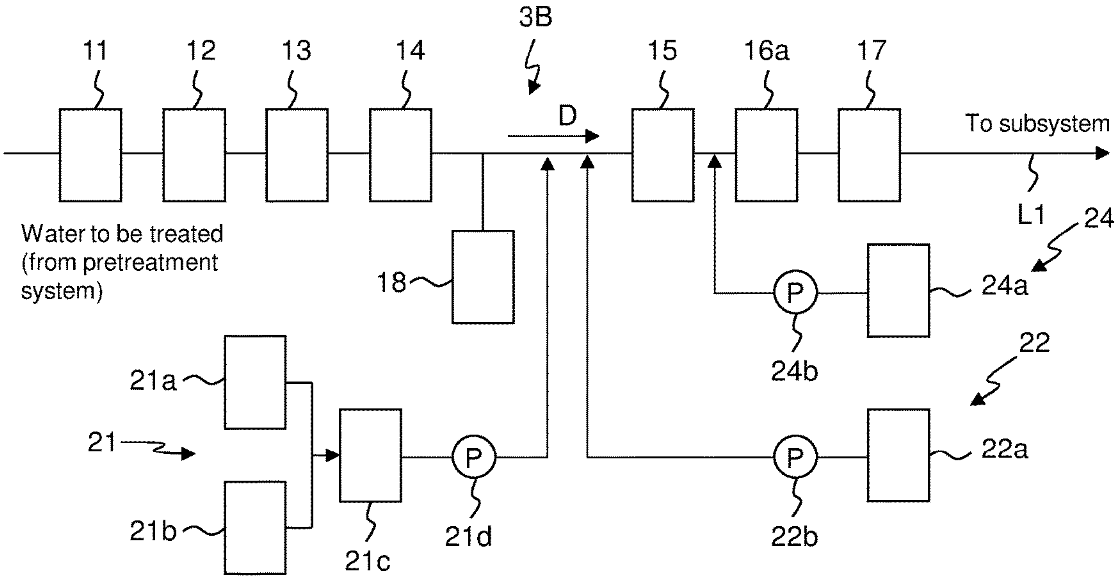
FIG. 3B is a schematic view illustrating the arrangement of a water treatment apparatus according to Embodiment 3B.

FIG. 3B schematically illustrates the arrangement of water treatment apparatus 3B according to Embodiment 3B of the present invention. In the present embodiment, anion exchangers and platinum group catalyst carriers are loaded in second ion exchanger apparatus 16*a*. The arrangement is otherwise the same as that of Embodiment 3A. In other words, in the present embodiment, anion exchangers and platinum group catalyst carriers are loaded in a single ion exchanger tower (second ion exchanger apparatus 16*a*) in the same manner as in Embodiment 2B. Cation exchangers may be further loaded in second ion exchanger apparatus 16*a*. See Embodiment 2B for details.

Example 1

Figure 4:
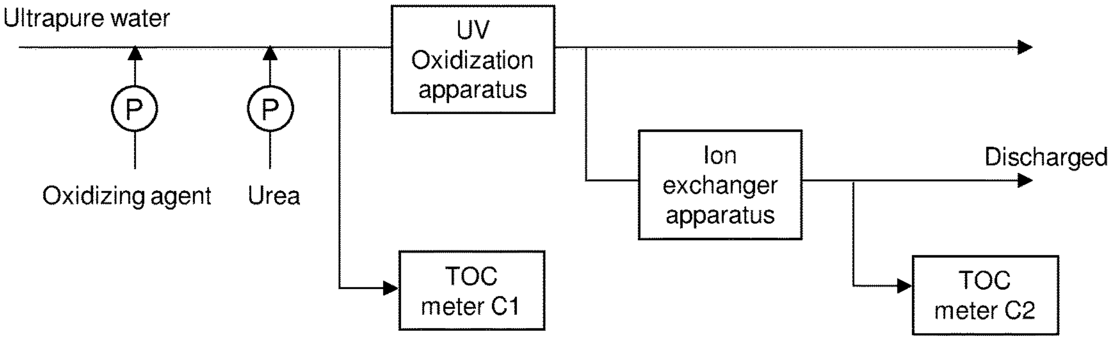
FIG. 4 is a schematic view illustrating the arrangement of the test apparatus used in Example 1.

A test apparatus shown in FIG. 4 was used to measure the removal rate of urea in order to confirm the effect of Embodiments 1A to 1C. An oxidizing agent was added to ultrapure water, and urea was added downstream thereof as a persistent organic material. The amount of urea that was added was adjusted such that the TOC was 16 μg/L and the concentration of urea was 80 μg/L in the water to be treated upstream of the ultraviolet ray radiating apparatus. Ultraviolet rays were radiated at a rate of 0.70 $kWh/m^3$ using an ultraviolet ray radiating apparatus sold by PHOTOSCIENCE JAPAN CORP. A non-regenerative mixed-bed ion exchanger apparatus having a capacity of 300 mL (hereinafter, referred to as an ion exchanger apparatus) was provided downstream of the ultraviolet ray radiating apparatus, and ion components were removed. Urea meters (ORUREA manufactured by Organo Corporation) were provided on the inlet side of the ultraviolet ray radiating apparatus and on the outlet side of the ion exchanger apparatus in order to measure the concentration of urea. In Example 1, hypobromous acid was added at a concentration of 2 mg-$Cl_2$/L (chlorine equivalent concentration) as an oxidizing agent. Hypobromous acid was produced by mixing NaBr and NaClO in the same manner as in Embodiments 1A to 1C. The concentration of hypobromous acid was measured by a free chlorine reagent and a salt content meter (manufactured by HANNA) after adding glycine to the sample water to convert free chlorine to combined chlorine. In Comparative Example 1-1, no oxidizing agent was added. In Comparative Example 1-2, hydrogen peroxide was added at a concentration of 2 mg/L as an oxidizing agent. The pH of the water to be treated was set to 7. The removal rate of urea was calculated as (C1−C2)/C1×100(%), where C1 is the concentration of urea in the water to be treated on the inlet side of the ultraviolet ray radiating apparatus and C2 is the concentration of urea in the treated water of the ion exchanger apparatus.

The removal rate of urea was 61.5% in Example 1, 3.2% in Comparative Example 1-1, and 4.0% in Comparative Example 1-2. It was found that the removal rate of urea was largely improved by adding hypobromous acid. In addition, it was found that the removal rate of urea was improved to some degree by adding hydrogen peroxide, but the effect was limited as compared with hypobromous acid.

Figure 5:
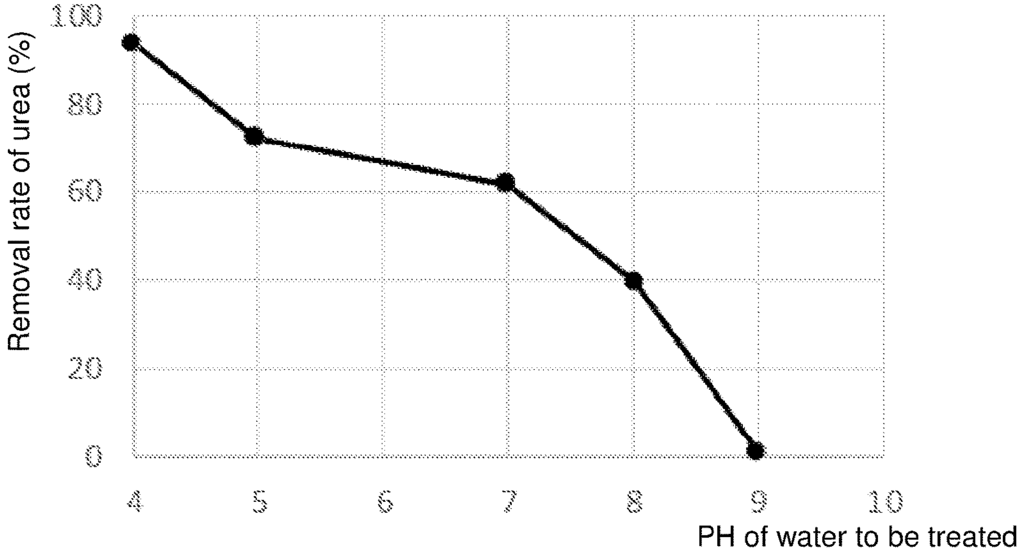
FIG. 5 is a graph showing the relationship between the pH of the water to be treated and the removal rate of urea in Example 1.

Next, in order to evaluate the influence of the pH of the water to be treated on the removal rate of urea, the removal rate of urea was measured for pH of 4, 5, 7, 8, and 9. The pH was adjusted by adding sulfuric acid to the water to be treated. The other conditions were the same as in the examples mentioned above. FIG. 5 shows the results. As the pH decreased, the removal rate of urea increased. The removal rate of urea can be improved by setting the pH to 8 or less, preferably 7 or less, more preferably 5 or less, and still more preferably 4 or less.

Figure 6:
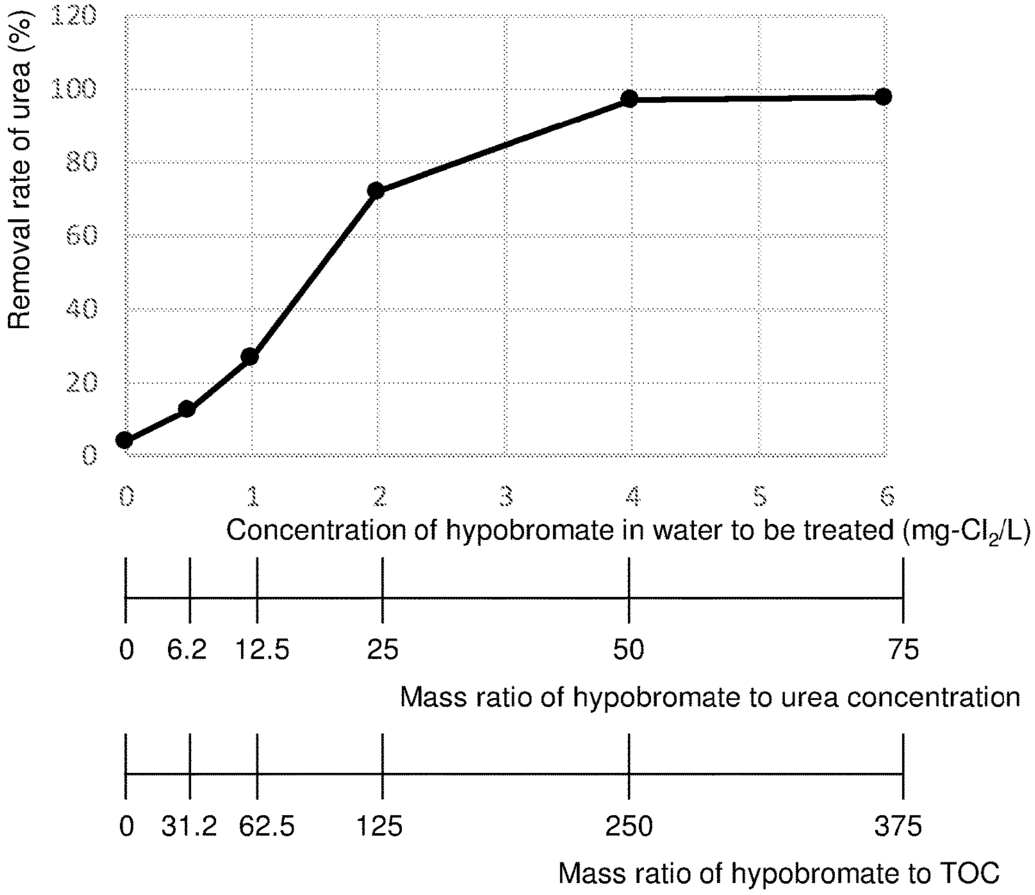
FIG. 6 is a graph showing the relationship between the concentration of hypobromous acid in the water to be treated and the removal rate of urea in Example 1.

Furthermore, the removal rate of urea was measured for the concentrations of hypobromous acid in the water to be treated of 0, 0.5, 1.0, 2.0, 4.0, and 6.0 mg-$Cl_2$/L. FIG. 6 shows the results. As the concentration of hypobromous acid increased, the removal rate of urea increased. The removal rate of urea can be improved by setting the concentration of hypobromous acid to 0.5 mg-$Cl_2$/L or more, preferably 1.0 mg-$Cl_2$/L or more, more preferably 2.0 mg-$Cl_2$/L or more, and still more preferably 4.0 mg-$Cl_2$/L or more. It should be noted that the removal rate of urea does not change greatly when the concentration of hypobromous acid is 4.0 mg-$Cl_2$/L or more. FIG. 6 also shows the mass ratio of hypobromous acid to TOC.

Example 2

Figure 7A:
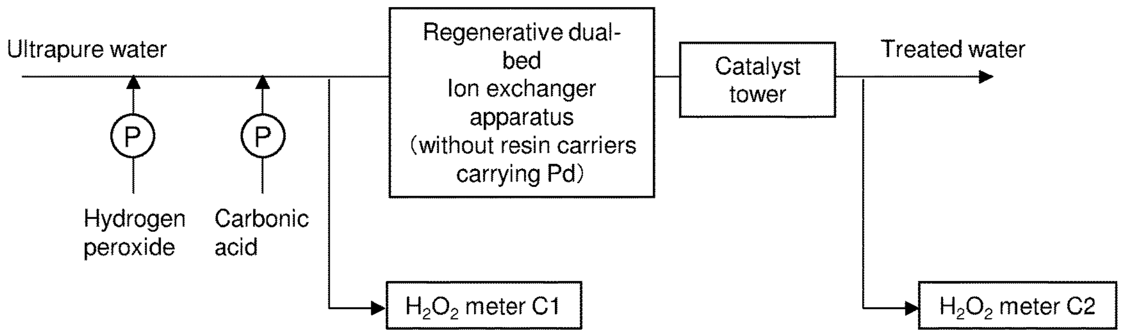
FIGS. 7A and 7B are schematic views illustrating the arrangement of the test apparatuses used in Example 2.
Figure 7B:
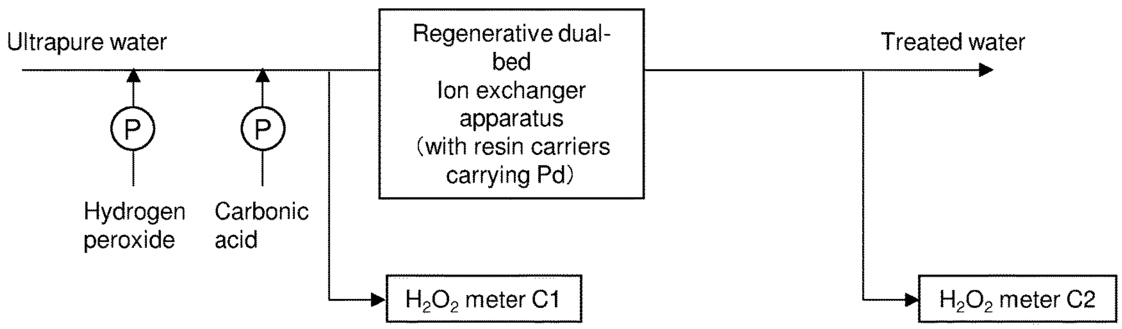

Test apparatuses shown in FIGS. 7A and 7B were used to measure the concentration of hydrogen peroxide in the treated water in order to evaluate the effect of Embodiments 2A and 2B. In Example 2-1, hydrogen peroxide was added to ultrapure water and carbonic acid was added downstream thereof as an anion load, as shown in FIG. 7A. Water to be treated was sequentially supplied to a regenerative ion exchanger apparatus in which anion exchanger resins and cation exchanger resins were loaded in a dual bed and to Pd catalyst carriers, and the concentration of hydrogen peroxide in the treated water (the outlet water of the Pd resin tower) was measured. In Example 2-2, water to be treated was produced in the same manner and was supplied to a regenerative ion exchanger apparatus in which anion exchanger resins, Pd catalyst carriers, and cation exchanger resins were loaded in the order in which the water is supplied, and the concentration of hydrogen peroxide in the treated water (the outlet water of the regenerative ion exchanger apparatus) was measured, as shown in FIG. 7B. In Comparative Example 2, although not shown, the regenerative ion exchanger apparatus in Example 2-1 was omitted. That is, the water to be treated was supplied to the Pd catalyst carriers without removing anion components from the water to be treated, and the concentration of hydrogen peroxide in the treated water (the outlet water of the Pd catalyst carriers) was measured.

In Examples 2-1 and 2-2 and in Comparative Example 2, hydrogen peroxide and carbonic acid were added such that the concentration of hydrogen peroxide was 100 μg/L and the concentration of carbonic acid was 1.5 mg/L. The water to be treated was supplied to the regenerative ion exchanger apparatus and the Pd catalyst carriers at a flow rate of 36 L/h. The removal rate of hydrogen peroxide was calculated as (C1−C2)/C1×100(%) where C1 was the concentration of hydrogen peroxide in the water to be treated on the inlet side of the ion exchanger apparatus and C2 was the concentration of hydrogen peroxide in the treated water of the Pd catalyst carriers (Example 2-1 and Comparative Example 2) or the regenerative ion exchanger apparatus (Example 2-2). The removal rate of hydrogen peroxide was 99% or more in Examples 2-1 and 2-2 and was 60% in Comparative Example 2. It was found that hydrogen peroxide could be efficiently removed by removing anion components in advance and then supplying water to the Pd catalyst carriers.

Example 3

Test apparatuses shown in FIGS. 8A to 9B were used to conduct Comparative Examples 3-1 to 3-5 and Examples 3-1 and 3-2 in order to confirm the effect of Embodiments 3A and 3B. Table 1 summarizes the results.

TABLE 1

| | Oxdizing agent | $H_2O_2$ added after UV radiation? | Pd catalyst carriers | Removal rate of urea (%) | Concentration of TOC in treated water (excluding urea) (μg/L) | Concentration of $H_2O_2$ in treated water (mg/L) | Removal rate of $H_2O_2$ of Pd catalyst carriers (%) | Remarks |
|---|---|---|---|---|---|---|---|---|
| Comp. Example 3-1 | Not added | No | Not provided | 3 | 0.8 | — | — | |
| Comp. Example 3-2 | $H_2O_2$ (2 mg/L) | | | 4 | | | | |
| Comp. Example 3-3 | Hypobromate (2 mg-$Cl_2$/L) | | | 60 | 40 | | | |
| Comp. Example 3-4 | | YES | | | 0.8 | 1 | | |
| Comp. Example 3-5 | | | Upstream of anion exchanger | | | 0.4 | 60 | |
| Example 3-1 | | | Downstream of anion exchanger | | | <0.01 | >99 | Pd catalyst carriers and ion exchangers are loaded in separate towers |
| Example 3-2 | | | | | | | | Pd catalyst carriers and ion exchangers are loaded in a single tower |

Figure 8A:
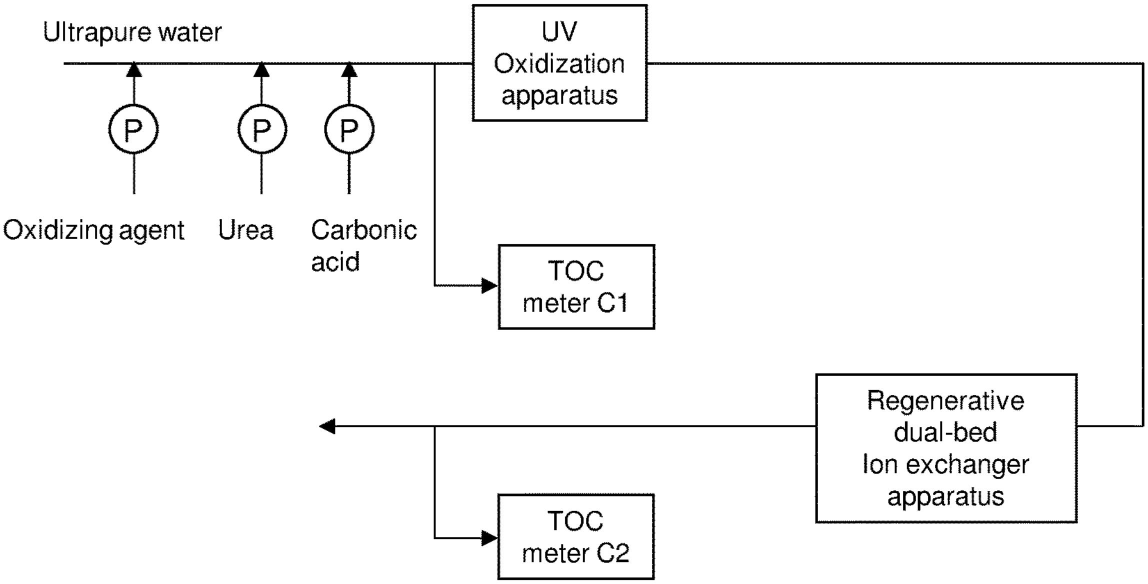
FIGS. 8A to 9B are schematic views illustrating the arrangement of the test apparatuses used in Example 3.

First, the test apparatus shown in FIG. 8A was used to conduct Comparative Examples 3-1 to 3-3. After adding urea, which is a persistent organic material, and carbonic acid, which is an anion load, to ultrapure water, ultraviolet rays were radiated to the water to be treated by the ultraviolet ray radiating apparatus. In Comparative Example 3-1, no oxidizing agent was added to the water to be treated. In Comparative Example 3-2, hydrogen peroxide, which is an oxidizing agent, was added at a concentration of 2 mg/L. In Comparative Example 3-3, hypobromous acid, which is an oxidizing agent, was added at a concentration of 2 mg-$Cl_2$/L. Hypobromous acid was produced by mixing NaBr and NaClO in the same manner as in Embodiments 3A to 3C. The concentration of urea was 80 μg/L, the TOC was 16 μg/L, and the concentration of carbonic acid was 2 mg/L. The concentration of urea was measured by a urea meter (ORUREA manufactured by Organo Corporation). The processes up to the radiation of ultraviolet rays were conducted in the same manner as in Example 1. A regenerative dual-bed ion exchanger apparatus (capacity 300 mL) was provided downstream of the ultraviolet ray radiating apparatus, and anion components were removed. The removal rate of urea, which was calculated by the same method as in Example 1, was 3% in Comparative Example 3-1, 4% in Comparative Example 3-2, and 60% in Comparative Example 3-3. These results are substantially the same as the results of Example 1. In Comparative Example 3-3, the concentration of hypobromous acid in the water to be treated after radiating ultraviolet rays was 1 mg-$Cl_2$/L. On the other hand, the TOC excluding urea that was measured by the urea meter (ORUREA) was 0.8 μg/L in Comparative Examples 3-1 and 3-2, and was 40 μg/L in Comparative Example 3-3. This is because hypobromous acid that remained after the radiation of ultraviolet rays from the ultraviolet ray radiating apparatus degraded the ion exchangers in the downstream ion exchanger apparatus.

Figure 8B:
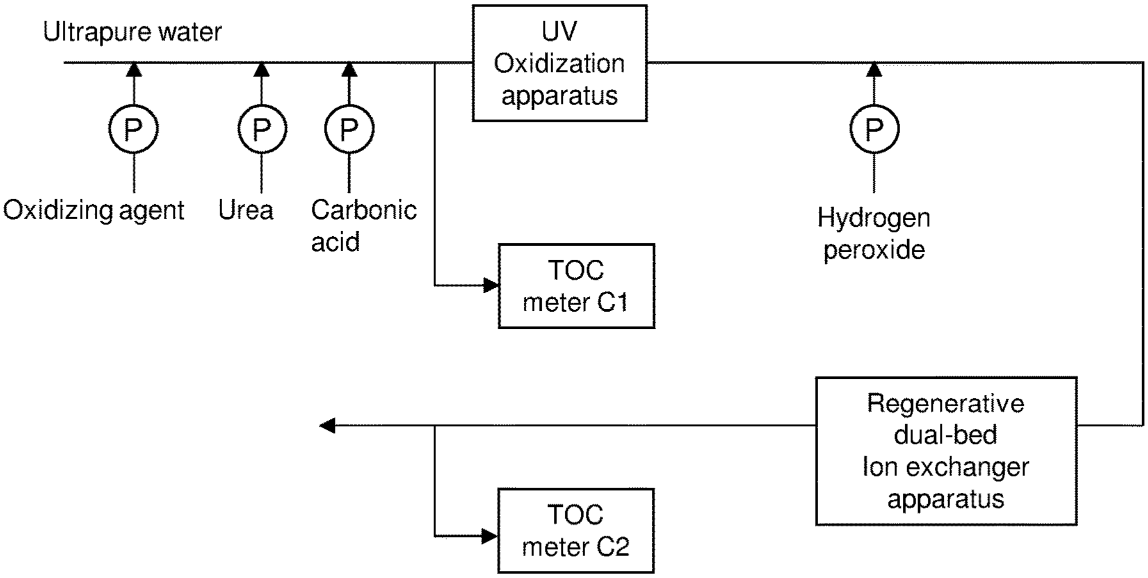

Next, in Comparative Example 3-4, hydrogen peroxide was added to the water to be treated at the outlet of the ultraviolet ray radiating apparatus at a concentration of 2 mg/L, and the same measurements were conducted as shown in FIG. 8B. The removal rate of urea was about the same level as in Comparative Example 3-3. The concentration of hypobromous acid in the water to be treated after hydrogen peroxide was added was less than 0.01 mg-$Cl_2$/L. From the comparison between Comparative Example 3-3 and 3-4, it was found that hypobromous acid was removed by hydrogen peroxide. The concentration of hydrogen peroxide was 1 mg/L both at the inlet and outlet of the ion exchanger apparatus, and the TOC excluding urea in the treated water of the ion exchanger apparatus was 0.8 μg/L. Thus, it is believed that elution of the TOC due to the degradation of resins did not occur when the concentration of hydrogen peroxide was about 1 mg/L.

Figure 9A:
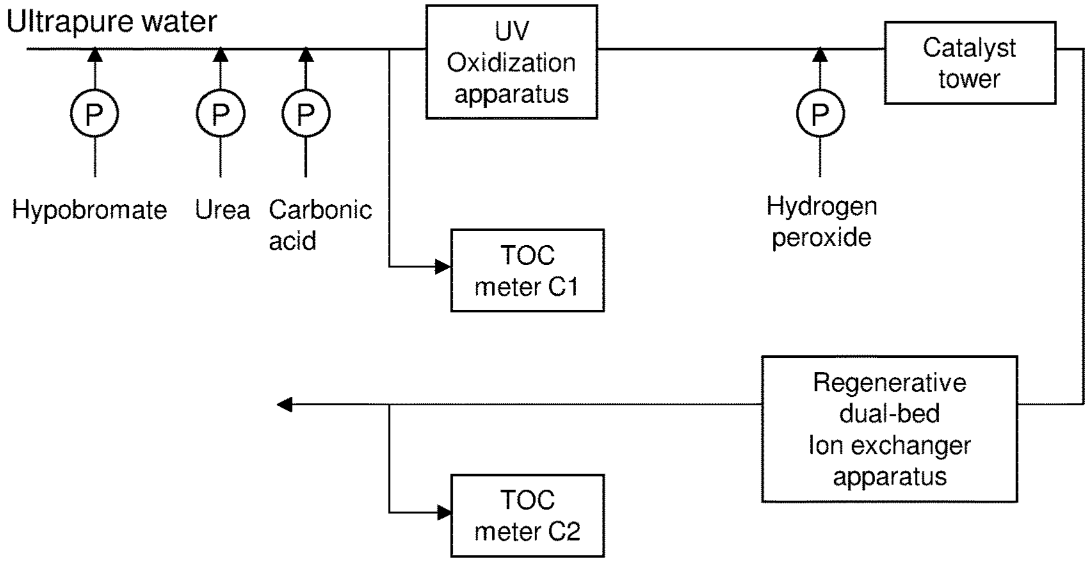

Next, in Comparative Example 3-5, Pd catalyst carriers were provided upstream of the ion exchanger apparatus, as shown in FIG. 9A. The concentration of hydrogen peroxide in the outlet water of the Pd catalyst carriers and the concentration of hydrogen peroxide in the treated water of the ion exchanger apparatus were 0.4 mg/L, and the removal rate of hydrogen peroxide was 60%. The concentration of carbonic acid was 2 mg/L at the inlet of the Pd catalyst carriers. Thus, it was found that when anions (carbonic acid) were not removed at the inlet of the Pd catalyst carriers, the removal rate of hydrogen peroxide was not remarkably high (60%).

Figure 9B:
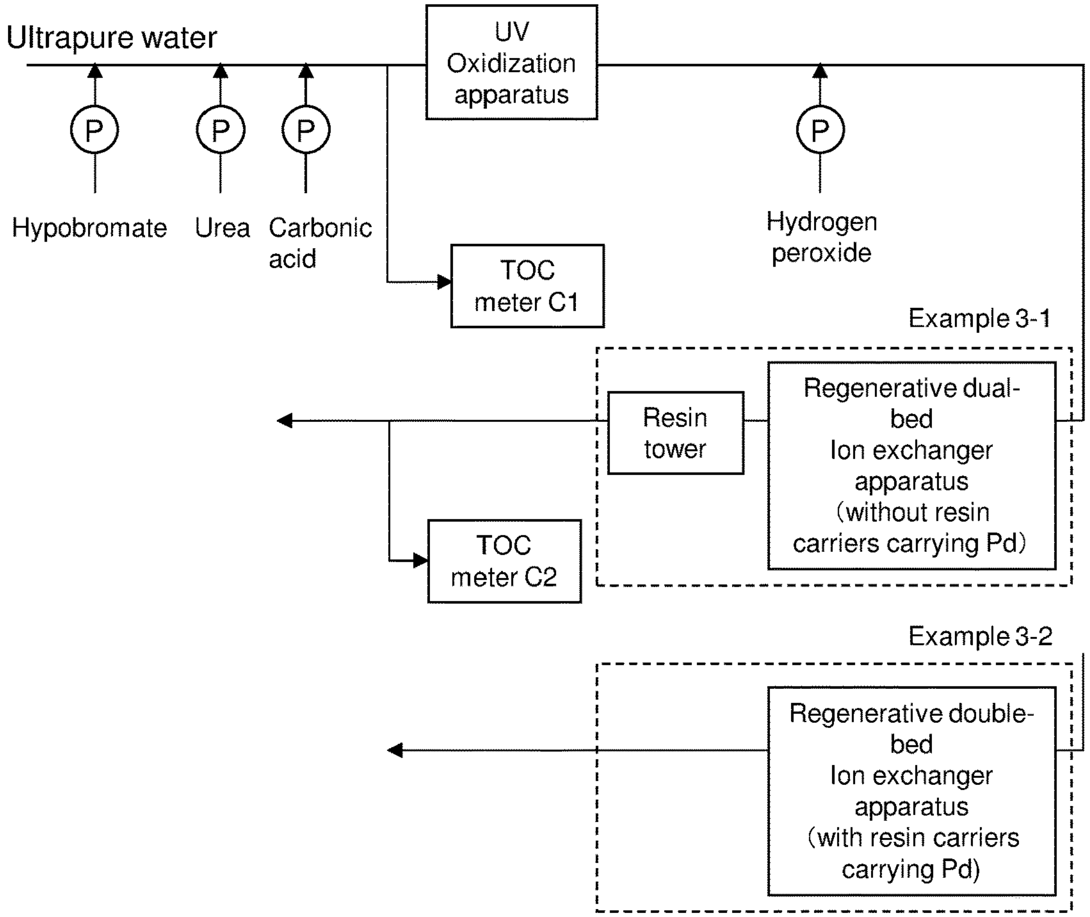

Next, in Examples 3-1 and 3-2, the test apparatus shown in FIG. 9B was used to conduct the same measurements. In Example 3-1, a catalyst tower in which Pd catalyst carriers were loaded was provided downstream of the ion exchanger apparatus. In Example 3-2, Pd catalyst carriers were loaded in the ion exchanger apparatus (anion exchanger resins, Pd catalyst carriers, and cation exchanger resins were sequentially loaded in the flow direction in which the water is supplied). Both the concentration of hydrogen peroxide at the outlet of the catalyst tower in Example 3-1 and the concentration of hydrogen peroxide at the outlet of the ion exchanger apparatus in Example 3-2 were less than 0.01 mg/L, and the removal rate of hydrogen peroxide was 99% or more. The concentration of carbonic acid in the treated water of the ion exchanger apparatus that was measured in Example 3-2 was less than 1 μg/L, and it was found that the anion components were removed by the ion exchanger apparatus.

Measurements were conducted in the same manner as in Example 1 for various pH of the treated water and for various concentrations of hypobromous acid. The same results as in Example 1 were obtained.

Although certain preferred embodiments of the present invention have been shown and described in detail, it should be understood that various changes and modifications may be made without departing from the spirit or scope of the appended claims.

LIST OF REFERENCE NUMERALS

1A to 1C, 2A to 2C, 3A to 3C pure water production apparatus
15 ultraviolet ray radiating apparatus
16, 16*a*, 16*b* second ion exchanger apparatus (anion removing means)
18 TOC meter (TOC analysis means)
20 catalyst tower
21 hypohalogenous acid addition means
22 pH adjusting means
23 reducing agent addition means
24 hydrogen peroxide addition means

What is claimed is:

1. A water treatment apparatus comprising:

hypohalogenous acid addition unit that adds hypohalogenous acid to water to be treated that contains organic materials;

an ultraviolet ray radiating apparatus that is positioned downstream of the hypohalogenous acid addition unit and that radiates ultraviolet rays to the water to be treated to which the hypohalogenous acid has been added;

a line that is connected to an inlet of the ultraviolet ray radiating apparatus;

an addition point that is provided on the line, wherein a pH adjusting liquid is added to the addition point;

pH adjusting unit that is connected to the addition point and that adjusts pH of the water to be treated to 3 or more and 8 or less; and a TOC analysis unit that is configured to measure TOC of the water to be treated upstream of the hypohalogenous acid addition unit; wherein the hypohalogenous acid addition unit is configured to add hypohalogenous acid having mass concentration that is at least 30 times the TOC that is measured by the TOC analysis unit, and the addition point and the ultraviolet ray radiating apparatus are connected to each other only by the line.

2. The water treatment apparatus according to claim 1, wherein the organic materials contain urea, further comprising urea analysis unit that measures concentration of urea in the water to be treated upstream of the hypohalogenous acid addition unit, wherein the hypohalogenous acid addition unit adds hypohalogenous acid having mass concentration that is at least 5 times the concentration of urea that is measured by the urea analysis unit.

3. The water treatment apparatus according to claim 1, wherein the hypohalogenous acid is hypobromous acid.

4. The water treatment apparatus according to claim 3, wherein the hypohalogenous acid addition unit includes a unit for supplying sodium bromide, a unit for supplying sodium hypochlorite, and a unit for mixing the sodium bromide and the sodium hypochlorite.

5. The water treatment apparatus according to claim 1, further comprising an ion exchanger apparatus that is positioned downstream of the ultraviolet ray radiating apparatus.

6. The water treatment apparatus according to claim 1, further comprising another ultraviolet ray radiating apparatus that is positioned downstream of the ultraviolet ray radiating apparatus.

7. A water treatment method comprising:

adding hypohalogenous acid to water to be treated that contains organic materials and that flows in a line, the hypohalogenous acid being added via a hypohalogenous acid addition unit;

adding a pH adjusting liquid to the water to be treated from an addition point that is provided on the line so as to adjust pH of the water to be treated to 3 or more and 8 or less; and radiating ultraviolet rays to the water to be treated by an ultraviolet ray radiating apparatus that is connected to the line, wherein the hypohalogenous acid has been added to the water to be treated and pH of the water to be treated has been adjusted, wherein the addition point and the ultraviolet ray radiating apparatus are connected to each other only by the line, a TOC analysis unit is provided upstream of the hypohalogenous acid addition unit that measures TOC of the water to be treated, and the hypohalogenous acid addition unit adds the hypohalogenous acid in a mass concentration that is at least 30 times the TOC that is measured by the TOC analysis unit.

8. The water treatment method according to claim 7, wherein the water to be treated contains anions, further comprising:

adding hydrogen peroxide to water to be treated to which the ultraviolet rays are radiated;

removing the anions from the water to be treated to which the hydrogen peroxide has been added; and removing the hydrogen peroxide by platinum group catalysts, wherein the hydrogen peroxide is contained in the water to be treated from which the anions have been removed.

9. The water treatment method according to claim 7, wherein the organic materials contain urea.

10. The water treatment method according to claim 7, wherein the hypohalogenous acid is added by a hypohalogenous acid addition unit, wherein the addition point and the ultraviolet ray radiating apparatus are connected to each other only by the line.

* * * * *